UNITED STATES PATENT OFFICE.

FILIP KAČER, OF MANNHEIM, GERMANY, ASSIGNOR TO BADISCHE ANILIN & SODA FABRIK, OF LUDWIGSHAFEN-ON-THE-RHINE, GERMANY, A CORPORATION.

ANTHRACENE DYE AND PROCESS OF MAKING SAME.

No. 931,618.  Specification of Letters Patent.  Patented Aug. 17, 1909.

Application filed March 24, 1908. Serial No. 422,972.

*To all whom it may concern:*

Be it known that I, FILIP KAČER, doctor of philosophy and chemist, subject of the King of Prussia, residing at Mannheim, Germany, have invented new and useful Improvements in Anthracene Dyes and Processes of Making the Same, of which the following is a specification.

In the specification of application for British Letters Patent No. 16,775/07 is described the production of a class of compounds termed 2-methyl-anthrapyridon compounds. I have now discovered that some of these 2-methyl-anthrapyridon compounds can also be employed in the production of new coloring matters, for instance 4-amino-2-methylanthrapyridon can be condensed with 2-halogen-anthraquinone compounds such for instance as 2-halogen-anthraquinone itself, or with 2.6- or 2.7-dihalogen-anthraquinone, also 4-halogen-2-methylanthrapyridon can be condensed with 2-amino-anthraquinone, or with 2.6- or 2.7-diamino-anthraquinone. If instead of first producing 4-halogen-2-methylanthrapyridon and then condensing it with a 2-aminoanthraquinone compound, 4-halogen-2-methyl-1-acetylaminoanthraquinone be condensed with the 2-amino-anthraquinone compound, the same coloring matter results. In each case valuable red coloring matter is obtained. That produced by condensing 4-amino-2-methyl-anthrapyridon with 2-halogen-anthraquinone is identical with the condensation product of 4-halogen-2-methyl-anthrapyridon with 2-amino-anthraquinone, in both cases the condensation is effected at the 4 position in the methyl-anthrapyridon body and in the 2 position in the other anthraquinone residue, so that by these two different, but equivalent processes, the linking of the two anthraquinone groups at the said positions is effected. The other coloring matters possess similar properties. The reaction can be carried out by heating the compounds preferably in the presence of a condensing agent or, in order to neutralize the hydrochloric acid evolved, in the presence of sodium carbonate, or sodium acetate. It is also convenient to carry out the reaction in the presence of a solvent of a high boiling point, for instance, quinolin, and methyldiphenylamin, or a solvent of lower boiling point can be employed if the reaction be carried on under pressure.

My new coloring matters are insoluble in water and in dilute acids and alkalies and in alcohol and benzene, they are soluble in nitrobenzene and in quinolin, and they yield violet solutions in concentrated sulfuric acid. They dye unmordanted cotton from a vat red.

The following examples will serve to illustrate further the nature of my invention and how it can be carried into practical effect, but my invention is not confined to these examples. The parts are by weight and the temperatures are in degrees centigrade.

Example 1: Boil together for from three (3), to four (4), hours in a reflux apparatus, one hundred and fifty (150) parts of nitrobenzene, ten (10) parts of 4-amido-2-methyl-anthrapyridon (obtainable as described in the fourth example of the aforesaid British specification), eight and four-fifths (8.8) parts of 2-chlor-anthraquinone, ten (10) parts of anhydrous sodium acetate, and two (2) parts of cuprous chlorid. When the mixture is cool, filter off the product and wash it consecutively with alcohol, water, dilute hydrochloric acid, and water. The product can be purified by dissolving it in alkaline hydrosulfite solution, filtering the solution, and precipitating the coloring matter by blowing air through the filtrate.

Example 2: Boil together, in a reflux apparatus, one hundred and fifty (150) parts of nitrobenzene, ten (10) parts of 4-amino-2-methyl-anthrapyridon, five (5) parts of 2.6-dichlor-anthraquinone, ten (10) parts of anhydrous sodium acetate, and two (2) parts of cuprous chlorid. When the formation of the coloring matter is complete, work up as described in the foregoing first example. In this example the 2.6-dichlor-anthraquinone can be replaced by an equal quantity of 2.7-dichlor-anthraquinone.

Example 3: Heat together, in an autoclave, for ten (10) hours, at a temperature of from two hundred and thirty (230), to two hundred and forty (240) degrees, ten (10) parts of 4-chlor-2-methylanthrapyridon, eight (8) parts of 2-aminoanthraquinone, fifteen (15) parts of sodium acetate, and one hundred and fifty (150) parts of water. When the reaction product is cold, filter it off, wash it with water, and dry it. The coloring matter can be obtained in the pure state by recrystallizing it from organic solvents of high boiling point, or by dissolving it in alkaline hydrosulfite solution, filtering and passing air through the filtrate.

Example 4: Boil together, ten (10) parts of 4-chlor-2-methyl-anthrapyridon, eight (8) parts of 2-aminoanthraquinone, ten (10) parts of anhydrous sodium acetate, and one hundred (100) parts of quinolin. When the formation of the coloring matter is complete, allow the mixture to cool, filter off the coloring matter and wash it, first with alcohol and then with water.

Example 5: Heat together, in an autoclave, for ten (10) hours, at a temperature of two hundred and thirty (230), to two hundred and forty (240), degrees, ten (10) parts of 4-chlor-2-methyl-anthrapyridon, four (4) parts of 2.6-diamino-anthraquinone, ten (10) parts of anhydrous sodium acetate, and fifty (50) parts of phenol. When the reaction product is cold, dilute it with one hundred (100) parts of alcohol, filter off the coloring matter, and wash it with alcohol and water.

Example 6: Boil together, for from two (2), to three (3), hours, ten (10) parts of 4-chlor-2-methyl-anthrapyridon, four (4) parts of 2.7-diamino-anthraquinone, ten (10) parts of anhydrous sodium acetate, and one hundred (100) parts of methyl-diphenylamin. When the reaction product is cold, filter off the coloring matter and wash it.

Example 7: Heat together, in an autoclave, for ten (10) hours, at a temperature of from two hundred and thirty (230), to two hundred and forty (240), degrees, four (4) parts of 4-chlor-2-methyl-1-acetylamino-anthraquinone, three (3) parts of 2-aminoanthraquinone, four (4) parts of anhydrous sodium acetate, and twenty-five (25) parts of phenol. When the melt is cold, add about fifty (50) parts of alcohol, and filter off the coloring matter and then wash it with alcohol and water.

Example 8: Heat together, in an autoclave, for from eight (8), to ten (10), hours, at a temperature of from two hundred and forty (240), to two hundred and sixty (260), degrees, twenty (20) parts of 4-chlor-2-methyl-1-acetylaminoanthraquinone, seven and three-fifths (7.6) parts of 2.6-diamino-anthraquinone, two hundred (200) parts of phenol and twenty (20) parts of anhydrous sodium acetate, and work up the melt as described in the foregoing example 7. In this example the 2.6-diamino-anthraquinone can be replaced by an equal weight of 2.7-di-amino-anthraquinone.

Now what I claim is:

1. The process of producing coloring matters of the anthracene series by condensing a 2-methyl-anthrapyridon body with another anthraquinone compound linking them at the 4 position of the former and the 2 position of the latter substantially as described.

2. The process of producing coloring matters of the anthracene series by condensing 4-halogen-2-methyl-anthrapyridon with a 2-amino-anthraquinone.

3. The process of producing coloring matters of the anthracene series by condensing 4-halogen-2-methyl-1-acetylamino-anthraquinone with a 2-amino-anthraquinone.

4. The process of producing coloring matters of the anthracene series by condensing 4-chlor-2-methyl-1-acetylamino-anthraquinone with a 2-amino-anthraquinone.

5. As new articles of manufacture the coloring matters being 2-methyl-anthrapyridon-anthraquinone-amin compounds, which ar. insoluble in water, and yield violet solutions in concentrated sulfuric acid and dye unmordanted cotton, from a vat, yielding red shades.

6. As a new article of manufacture the coloring matter being 2-methyl-anthrapyridon-anthraquinone-amin which is insoluble in b. water and in dilute acids and alkalies, and in alcohol and benzene, soluble in nitrobenzene and quinolin, soluble in concentrated sulfuric acid with a violet color, and dyeing unmordanted cotton from a vat, yielding red shades.

In testimony whereof I have hereunto set my hand in the presence of two subscribing witnesses.

FILIP KAČER.

Witnesses:
J. ALEC. LLOYD,
JOS. H. LEUTE.